(12) United States Patent
Kawasaki et al.

(10) Patent No.: US 6,481,759 B1
(45) Date of Patent: Nov. 19, 2002

(54) CONNECTING STRUCTURE

(75) Inventors: Minoru Kawasaki, Komaki (JP); Kazuhito Kasahara, Komaki (JP); Atsuo Miyajima, Inuyama (JP); Kazushige Sakazaki, Komaki (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/621,055

(22) Filed: Jul. 21, 2000

Related U.S. Application Data

(63) Continuation-in-part of application No. 09/281,957, filed on Mar. 31, 1999, now Pat. No. 6,199,919.

(30) Foreign Application Priority Data

Jul. 21, 1999  (JP) ........................................... 11-206107
Jun. 7, 2000  (JP) ........................................ 2000-170560

(51) Int. Cl.$^7$ ............................................. F16L 37/084
(52) U.S. Cl. ..................................... 285/319; 285/331
(58) Field of Search ................................ 285/319, 331, 285/256, 322

(56) References Cited

U.S. PATENT DOCUMENTS

| | | | | |
|---|---|---|---|---|
| 4,427,219 A | * | 1/1984 | Madej ........................ 285/249 |
| 4,601,497 A | * | 7/1986 | Bartholomew ............... 285/319 |
| 4,969,669 A | * | 11/1990 | Sauer .......................... 285/256 |
| 5,082,315 A | * | 1/1992 | Sauer .......................... 285/256 |
| 5,228,724 A | * | 7/1993 | Godeau ......................... 285/93 |
| 6,089,621 A | * | 7/2000 | Nishio ......................... 285/331 |
| 6,199,919 B1 | * | 3/2001 | Kawasaki et al. .......... 285/319 |

* cited by examiner

Primary Examiner—Jack Lavinder
Assistant Examiner—Bradley King
(74) Attorney, Agent, or Firm—Oblon, Spivak, McClelland, Maier & Neustadt, P.C.

(57) ABSTRACT

A connecting structure including a press-fitting body 341 of a press-fitting member 34 is press-fitted into one end of a resin tube 1 to thereby form a diameter-enlarged end portion 1a at one end of the resin tube 1 and fixedly engage an axially-inner end portion of the diameter-enlarged end portion with inner circumferential surface of a base portion 271 of a connection member 27. A sealing member 71 is fitted into an annular outer circumferential groove formed in the outer circumference of the diameter-enlarged end portion. An end portion 551 of a mating member 55 is fitted onto or inserted into the diameter-enlarged end portion, so that the end portion 551 engages the outer circumference of the sealing member in a fluid-tight condition. Upon insertion or fitting of the end portion of the mating member, a second engagement portion 552 projecting radially outward from the outer circumferential surface of the end portion 551 of the mating member 55 engages arm portions 272 of the connection member.

4 Claims, 12 Drawing Sheets

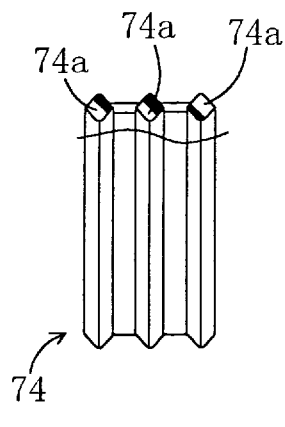
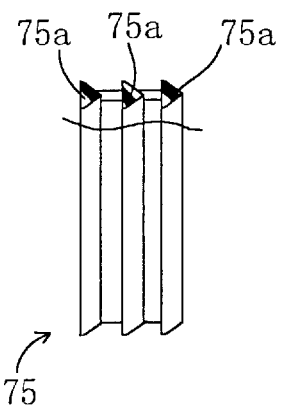
Fig. 19A                    Fig. 19B
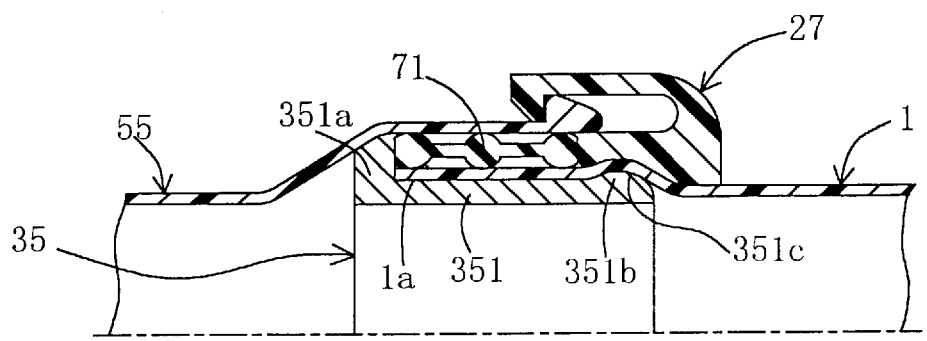
Fig. 20
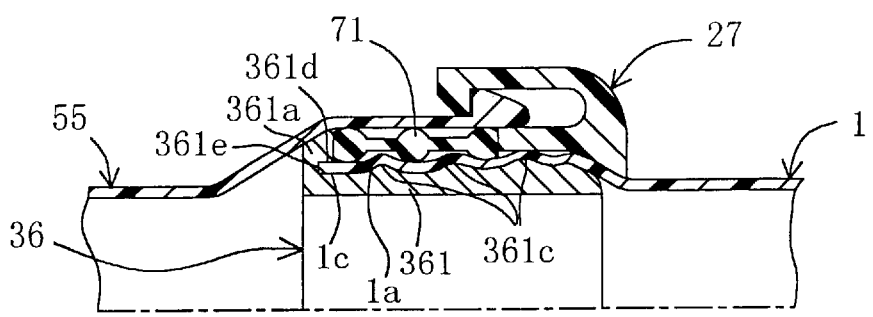
Fig. 21

CONNECTING STRUCTURE

CROSS-REFERENCES TO RELATED APPLICATIONS

This is a continuation-in-part application of our prior application Ser. No. 09/281,957 filed on Mar. 31, 1999 now U.S. Pat. No. 6,199,919.

BACKGROUND OF THE INVENTION

The present invention relates to a connecting structure between a resin tube and a tubular mating member. The present invention relates to, in detail, a connecting structure between a resin tube, such as an automotive tube such as, for example, a fuel tube, and a tubular mating member such as a metal pipe.

A rubber tube has been conventionally used as an automotive fuel tube or the like. In recent years, however, the rubber tube tends to be replaced by a resin tube made of hard resin, such as nylon, having good gasoline permeability resistance or the like due to its lower cost. The same thing occurs to other automotive dedicated tubes such as an air tube.

Conventionally, as disclosed in, for example, U.S. Pat. No. 5,161,833 and U.S. Pat. No. 4,991,882, in case of fluid-tight connecting a resin tube of this type to a mating member, the following connecting structure is known. A containing portion is formed such that a retaining member is retained on axial one end of an axis bore of the cylindrical housing and a ring-shaped elastic seal member, such as an O ring, is retained axially inward of this retaining member. When the insertion end portion of a tubular mating member is inserted into the interior of the retaining member from one end of the housing thereof, the retaining member is snap-engaged with an annular stopper on the insertion end portion to thereby fluid-tight connect the mating member to the one end portion of the housing. At the same time, an engaged one end portion having an outer peripheral surface smaller in diameter than the one end portion is formed integrally with the other end of the housing. The inner peripheral surface of the one end portion of the resin tube is press-fitted into the engaged end portion and the resin tube is fluid-tight connected to the other end portion of the housing. The housing having the retaining member retained on one end portion and the tubular mating member inserted into the one end portion of the housing form a quick connector as a whole. Normally, a tube connecting structure using the quick connector is widely used.

The above-stated quick connector is complicate in structure and expensive. Due to this, there has been proposed a method of directly connecting a resin tube to a tubular mating member not using the quick connector but using a simple member. This is disclosed in, for example, the published specification of EP0840051. Specifically, it discloses a hose connecting structure in which the first engagement portion of a tubular mating member is formed integrally with the end portion, which is blow-molded, of a resin tube, an elastic seal member such as an O ring is installed into an annular groove, which is also blow-molded, and the second engagement portion of the tubular mating member is engaged with the first engagement portion of the resin tube, thereby connecting the resin tube with the tubular mating member.

In the tube connecting structure connecting a resin tube with a tubular mating member using the conventional quick connector, the engaged end portion of a cylindrical housing is press-fitted into the inner peripheral surface of one end of the resin tube. The problem with this structure is that the connecting portion is lacking in the reliability in terms of pulling resistance and sealing property. And the tube connecting structure using the conventional quick connector is complicated in structure and requires a number of parts. As a result, the structure becomes expensive. It also requires two liquid-tight seal connecting portions axially separated from each other, with the result that the tube connecting structure becomes longer in axial direction. In these circumstances, demand for a tube connecting structure which is more compact, requires lower cost and ensures that a resin tube is liquid-tight connected to a tubular mating member is rising.

By the way, the tube connecting structure proposed in the published specification of EP0840051 as stated above does not employ a conventional quick connector mentioned above. Thus, it is relatively simple in structure and is excellent is sealing property. This is because the resin tube is directly connected to the tubular mating member by putting an elastic seal member between the resin tube and the tubular mating member.

However, due to the fact that the first engagement portion is formed integrally with the end portion of the resin tube so as to engage the resin tube with the tubular mating member, the structure of EP0840051 requires bothersome blow molding. That is, it requires setting a resin tube into a blow molding die and then blow molding or injection molding the first engagement portion, or setting the first engagement portion, which has been molded independently in advance, into a blow molding die and then extruding parison into the blow molding die to thereby blow-molding the first engagement portion. Thus, the structure is disadvantageous in that it has poor productivity and that the merit of low cost is thereby lost.

SUMMARY OF THE INVENTION

In view of these circumferences of the prior art, the objective of the present invention is to provide a connecting structure capable of directly connecting a resin tube and a tubular mating member in a fluid-tight condition, unlike a conventional case of using a quick connector where a nipple formed on the other end of the connector housing is press-fitted into an inner peripheral surface of the end portion of a resin tube to make a connection between the resin tube and the mating member, and unlike a conventional case of employing a blow molding for integrally forming a first engaging portion into the resin tube, and thereby providing a connecting structure which is capable of connecting a resin tube and an mating member to each other via an elastic sealing member and which is excellent in sealing properties as well as being a simple and compact in structure and low at cost.

For achieving the above objective, the present invention provides a connecting structure for connecting a resin tube to an mating member in a fluid-tight condition, includes: the resin tube including a tube body formed with a cylindrical wall with a substantially uniform thickness, and a diameter-enlarged end portion which has an opening and is formed at one end of the tube body; a connecting member including a tubular base portion inserted to an outer peripheral surface at the other side of the diameter-enlarged end portion of the resin tube, and a first engaging element extending outward from the base portion; a tubular press-fitting means for preventing the connecting member from removing toward the one end of the resin tube, including at least one press-fitting body press-fitted into the opening of the resin tube from the one end side thereof, the one press-fitting body including an outwardly protruding annular element in a radial direction beyond the outer peripheral surface of the diameter-enlarged end portion at one end side thereof, the at least one press-fitting body being press-fitted into the one end of the resin tube to form the diameter-enlarged end portion, and the inner peripheral surface of the base portion of the connecting member which is inserted and fitted to the outer periphery at the other end side being capable of being firmly attached and fitted or engaged with the other side of the diameter-enlarged end portion in a resisting relation; an annular sealing member mounted in either one of annular grooves of an annular outer peripheral groove formed in a space on the outer peripheral surface of the diameter-enlarged end portion in an axial direction between the annular stopper surface of the bush and the base portion of the connecting member, or an annular inner peripheral groove formed in a space at an inner peripheral of the opening of the enlarged-diameter end portion between the one press-fitting body and the other press-fitting body independent from the one press-fitting body; a tubular mating member including an inserting end portion capable of being relatively inserted into the outer peripheries of the annual stopper surface of the bush and the base portion of the connecting member by being engaged with the outer periphery of the sealing member in a fluid-tight condition, or capable of relatively being inserted into the inner surfaces of the one press-fitting body and the other press-fitting body by being engaged with the inner periphery of the sealing member in a fluid-tight condition; and a second engaging element projecting outward from the outer peripheral surface of the inserting end portion of the mating member in a radial direction, the second engaging element capable of being engaged with the first engaging element when the inserting end portion is relatively inserted into the diameter-enlarged end portion.

In a preferable embodiment of the connecting structure of the present invention, the connecting member has a restricting inner peripheral surface at the other end of the tubular base portion of the connecting member, and the diameter of the restricting inner surface gradually decreases toward the other side of the resin tube. The tubular press-fitting means includes a press-fitting body, and the press-fitting body is press-fitted into one end of the resin tube to form a diameter-enlarged end portion. The diameter-enlarged end portion has a tapered shoulder wall at the other side thereof, and the diameter of the shoulder gradually decreases toward the other side of the resin tube. When the connecting member is inserted and mounted on the outer periphery at the other side, the restricting inner peripheral surface of the base portion of the connecting member is firmly attached and fixed or engaged in a resisting relation with the shoulder wall formed at the other side of the diameter-enlarged end portion of the resin tube. With this arrangement, the movement of the connecting member toward one end of the resin tube is prevented.

The press-fitting means includes one press-fitting body. The press-fitting body includes a protruding element with a stopper surface formed by a flange or cap-shaped holder.

On the outer peripheral surface of the diameter-enlarged end portion of the resin tube, the base portion of the connecting member has an opposing end portion in an opposing relation to the annular back surface of the flange of the press-fitting member. An annular outer peripheral groove is formed in the space in an axial direction between the annular back surface of the flange and end surface of the opposing end portion of the connecting member. In the annular groove, the annular sealing member is mounted in such a manner that the sealing member is in tightly contact with the outer peripheral surface of the diameter-enlarged end portion.

In another embodiment of the connecting structure of the present invention, the press-fitting means includes a first press-fitting member and a second press-fitting member which are independent from each other. The first press-fitting member has a tapered portion at the other end side of the resin tube, and the tapered portion is formed with a tapered outer surface with a diameter gradually decreasing toward the other end side. The second press-fitting member has a flange at one end side projecting from the outer peripheral surface of its tubular press-fitting body. The second press-fitting member is disposed at a position coaxially remote from one terminal end the first press-fitting member.

In a preferable embodiment, the first press-fitting member and the second press-fitting member are integrally formed into one-piece unit.

The resin mating member has an inserting end portion at its one end, and the inserting end portion has a diameter larger than the other end side via a tapered wall portion. When the inserting end portion is inserted relatively into the diameter-enlarged end portion of the resin tube, the inner peripheral surface of the inserting end portion is engaged with the outer peripheral surface of the annular sealing member, and at the same time, the tapered outer peripheral surface of the flange of the press-fitting member is brought into contact with the tapered wall portion of the mating member. On the outer peripheral surface of the inserting end portion of the mating member, an annular second engaging element is formed. The second engaging element is snappedly engaged with the first engaging element of the connecting member when the outer peripheral surface of the flange is brought into contact with the tapered wall.

According to the present invention, the connecting structure which has excellent sealing properties can be provided, wherein the resin tube can be directly connected to the tubular mating member via a tubular or ring-shaped elastic sealing member by use of a connecting member inserted and fixed to the outer peripheral surface of the end portion of the resin tube.

The connecting structure of the present invention does not use a conventional connector having a complicated structure with a nipple to be press-fitted into an inner peripheral surface of the resin tube for connection. The connecting structure does not need the blow molding and blow molding die for integrally forming the first engaging portion and the resin tube into one-piece unit. Thus-formed connecting structure has a simple structure with high productivity and is low at cost.

BRIEF DESCRIPTION OF THE DRAWINGS

FIG. 19 is a notched cross-sectional view for explaining the annular sealing member according to still another embodiment based on FIG. 14.

FIG. 20 is a cross-sectional view of the upper half of a main portion of a press-fitting member according to still another embodiment based on FIG. 14.

FIG. 21 is a cross-sectional view of the upper half of a main portion of a press-fitting member according to still another embodiment based on FIG. 14

DETAILED DESCRIPTION OF PREFERRED EMBODIMENTS

Figure 1:
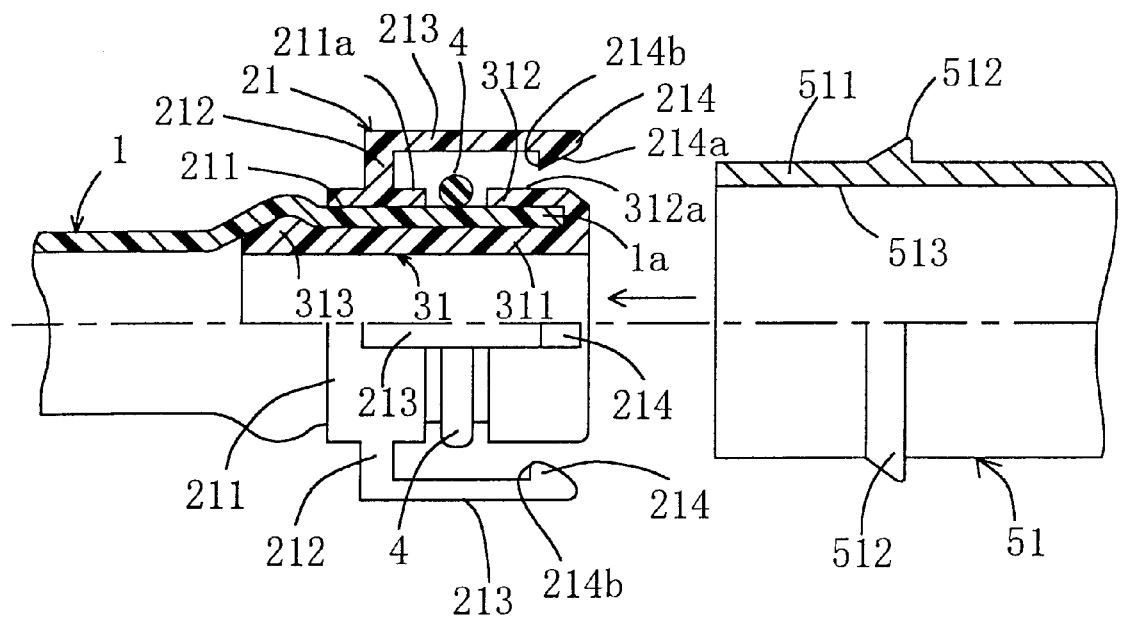
FIG. 1 shows an example of a tube connecting structure according to the present invention and schematically shows a partially cut side view in a state in which a resin tube is not yet connected to a tubular mating member.

According to the present invention, a cylindrical base of a resin engagement member formed into one piece is fitted into the outer peripheral surface of the end portion of a resin tube. Thereafter, a cylindrical press-fitted member is press-fitted into the inner peripheral surface of the end portion of the resin tube, thereby slightly expanding the diameter of the end portion of the resin tube. The cylindrical base of the engagement member is, thus, fixed to the outer peripheral surface of the end portion of a wider diameter without positional displacement. According to the present invention, therefore, it is not required to blow-mold the end portion of the resin tube so as to fix the engagement member or the like as in the tube connecting structure described in the published specification of EP0840051 stated above. Thus, a longer resin tube having an engagement member extrusion-molded to engage with a tubular mating member can be easily fixedly attached into any shorter resin tube of a single layer or multiple layers having straight-cut end portions of predetermined lengths, which attachment is quite cost effective.

Moreover as mentioned above, the engagement member fixed to the outer peripheral surface of the end portion of the resin tube can be easily and directly connected to the tubular mating member without using other members, by engaging the first engagement portion of the engagement member with the second engagement portion of the tubular mating member. It is noted that the shape of the first engagement portion of the engagement member and that of the second engagement portion of the tubular mating member are not limited to any specific shapes. They may be freely chosen so that the engagement member is surely connected to the tubular mating member without separation. Since a ring-shaped elastic seal member, such as an O ring, is put between the resin tube and the tubular mating member both of which have been thus directly connected to each other, excellent sealing property can be exhibited. In addition, the cylindrical press-fitted member press-fitted into the inner peripheral surface of the end portion of the resin tube allows the dimensional accuracy of the end portion of the resin tube to enhance to thereby further improve sealing property and to reinforce the end portion of the resin tube which tends to be damaged or deformed by external stress.

Various types of tubes which have been conventionally and normally available automotive tubes and the like can be used as resin tubes. Any straight or curved tubes may be used as long as the end portions thereof are straight. Although the material of the resin tube is not specifically limited, nylon or fluoroplastic material may be preferable for a fuel tube. The tube may be normally mono-layered or multiple-layered made of different types of resin. Also, to add conductivity, a multiple-layered tube having, for example, a conductive ETFE layer, a conductive nylon layer or the like included as an inner layer may be used. The resin tube such as, for example, a fuel tube, is normally about 4 to 18 mm in inner diameter and about 0.5 to 2 mm in thickness.

The engagement member formed into one piece and the cylindrical press-fitted member in the present invention may be made of hard resin or metal. Preferably, they are made of resin such as polyacetal resin and nylon resin in light of production cost. A conventional member such as an O ring can be used as a ring-shaped seal member. A metal or resin pipe to which a resin tube is connected, such as a pipe attached to various equipment such as, for example, an automotive engine may serve as a tubular mating member.

The tube connecting structure according to the present invention will now be specifically described with reference to the accompanying drawings. A preferred example of a tube connecting structure is shown in FIG. 1. The tube connecting structure shown therein basically consists of a resin tube 1 having a straight end portion on axial one end, a resin engagement member 21 including a cylindrical base 211 inserted into and attached onto the outer peripheral surface of the end portion 1a of the tube 1 and a ratcheted first engagement portion 214 integrally formed with the base 211, a cylindrical press-fitted member 31 press-fitted into the inner peripheral surface of the end portion 1a of the resin tube 1, a ring-shaped elastic seal member 4 inserted into one end side of the resin tube 1 from the cylindrical base 211 on the outer peripheral surface thereof, and a cylindrical mating member 51 which has an integrally formed second engagement portion 52 engaged with the first engagement portion 214 of the engagement member 21. The cylindrical base 211 of the engagement member 21 is fixed to the outer peripheral surface of the resin tube 1 since the diameter of the tube 1 is expanded by the cylindrical body 311 of the press-fitted member 31 which is press-fitted into the inner peripheral surface of the resin tube 1.

The above engagement member 21 will be described in more detail. As shown in FIG. 1, the engagement member 21 is provided with a plurality of supports 212 which circumferentially rise from the outer peripheral surface 211a of the cylindrical base 211 radially outward in a columnar manner and are spaced from one another. Arm portions 213 axially extending from the upper ends of the supports 212 toward one end direction axially are integrally formed with the cylindrical base 211, and are radially spaced from the outer peripheral surface 211a of the cylindrical base 211 respectively. A ratcheted first engagement portion 214 having a stopper surface 214b radially protruding and extending in the direction perpendicular to the axial direction is formed on one side end portion of each arm portion 213. The first engagement portions 214 protruding from the end portions of the respective arm portions 213 are snap-engaged with the second engagement portion 512 annually protruding on the outer peripheral surface of the insertion end portion 511 of the tubular mating member 51 when the tubular mating member 51 is inserted into the plural arm portions 213.

That is to say, the ratcheted protruding first engagement portions 214 has an insertion side one end of a greater diameter so as to easily insert the insertion end portion 511 of the tubular mating member 51 into the engagement member 21. The inner peripheral surface of each of the first engagement portions 214 forms an inclined surface 214a having a diameter gradually reduced toward the other end thereof. A stopper surface 214b is formed on the surface opposite to the inclined surface 214a in the direction perpendicular to the axis axial direction. Thus, if the tubular mating member 51 is inserted into the interiors of the plural arm portions 213 of the engagement member 21, the second engagement portion 512 of the annular mating member 51 progresses along the inclined surfaces 214a of the first engagement portions 214 while the arm portions 213 are being elastically deformed outward in radial direction, as will be described later. The second engagement portion 512 is snap-engaged with the stopper surfaces 214b after the arm portions 213 return to original shapes, respectively.

Next, the assembly of the tube connecting structure will be described with reference to FIG. 1 and FIG. 2. First, as shown in FIG. 1, the cylindrical base 211 of the engagement member 21 and the ring-shaped elastic seal member 4 are inserted into the outer peripheral surface of the end portion of the resin tube 1. The cylindrical body 311 of the press-fitted member 31 is then press-fitted into the inner peripheral surface of the tube 1 from the end portion 1a of the tube 1. By press-fitting the cylindrical body 311 of the press-fitted member 31 into the inner peripheral surface thereof, the diameter of the resin tube 1 is expanded radially outward. Due to this, the cylindrical base 211 of the engagement member 21 inserted into and attached onto the outer peripheral surface of the end portion of the resin tube 1 is pushed by the outer peripheral surface of the tube 1 having a expanded diameter and is fixed thereto. Further, a nipple 313, smoothly protruding radially outward, is provided at the insertion side tip end portion of the cylindrical press-fitted member 31. Thus, if the nipple 313 is moved beyond the cylindrical base 211 of the engagement member 21 and press-fitted into the other end side of the tube 1, the resin tube 1 is firmly put between the press-fitted member 31 and the cylindrical base 211 to thereby prevent the positional displacement among the press-fitted member 31, the resin tube end portion 1a and the base 211 of the engagement member 21 relative to one another.

A cap-shaped outer cylinder portion 312 is returned outwardly of the cylindrical body 311 to cover an end face of the resin tube 1 and outer peripheral surface of one end portion of the resin tube 1 from one end of the cylindrical body 311 of the press-fitted member 31 is provided the cylindrical press-fitted member 31 press-fitted into the inner peripheral surface of the end portion of the resin tube 1. Therefore, if the cylindrical body 311 of the press-fitted member 31 is press-fitted as stated above, the end portion 1a of the resin tube 1 is fitted and inserted into a groove formed between the cap-shaped outer cylindrical portion 312 and the cylindrical body 311 to thereby cover the end face of the resin tube 1, so that the end face is prevented from being exposed to fluid. Besides, the cap-shaped outer cylindrical portion 312 reaches onto the outer peripheral surface of the end portion of the resin tube 1, it is ensured that the ring-shaped elastic seal member 4 is retained an annular groove between the cap-shaped outer cylindrical portion 312 and the cylindrical base 211 of the engagement member 21.

In this embodiment, the cap-shaped outer cylindrical portion 312 is formed on one end portion of the cylindrical press-fitted member 3. The cylindrical press-fitted member 3 may be a straight tube and a separately formed ring-shaped retaining member may be fitted into the outer peripheral surface of the one end of the resin tube 1, whereby the ring-shaped elastic seal member 4 can be retained between the retaining member and the cylindrical base 211 of the engagement member 21.

Figure 2:
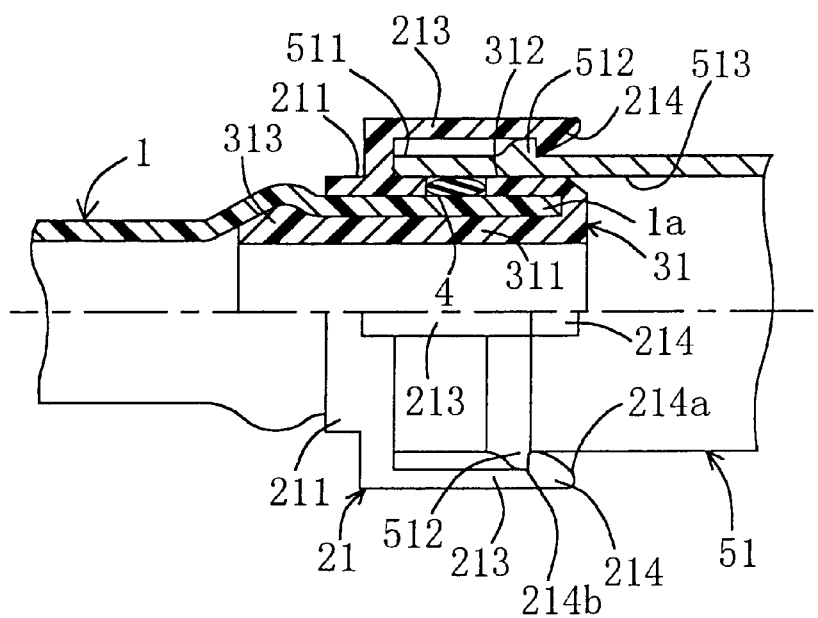
FIG. 2 shows an example of the tube connecting structure according to the present invention and schematically shows a partially-cut side view in a state in which the resin tube has been connected to the tubular mating member.

Thereafter, as shown in FIG. 2, the end portion 1a of the resin tube 1, whose outer peripheral surface the engagement member 21 is fixed to, is inserted into and connected to the tubular mating member 51. The insertion end portion 511 of the tubular mating member 51 is inserted into the radial space of the plural arm portions 213 of the engagement member 21. Also, the inner peripheral surface 513 of the insertion end portion 511 of the tubular mating member 51 is engaged with the outer peripheral surface 211a of the cylindrical base 211 of the engagement member 21 and with the outer peripheral surface 312a of the cap-shaped outer cylindrical member 312 of the cylindrical press-fitted member 31. At this time, the annular second engagement projection 512 protruding radially outward of the outer periphery of the insertion end portions 511 of the tubular mating member 51 progresses along the inclined surfaces 214a of the ratcheted first engagement portions 214 while the arm portions 213 are being elastically deformed outward in radial direction. When the second engagement portion 512 passes through the inclined surfaces 214a, the arm portions 213 elastically deformed outward in radial direction return to their original shapes and the second engagement portions 512 are engaged with the stopper surfaces 214b of the first engagement portions 214, respectively, thereby connecting the tubular mating member 51 with the resin tube 1.

In this state, the inner peripheral surface 513 of the tubular mating member 51 is retained by the outer peripheral surfaces 211a and 312a of the cylindrical base 211 of the engagement member 21 and the cap-shaped outer cylindrical portion 312b of the cylindrical press-fitted member 31, with the surface 513 slid onto or closely adjacent to the surfaces 211a and 312a. At the same time, the ring-shaped elastic seal member 4 is put between the outer peripheral surface of the resin tube 1 and the inner peripheral surface 513 of the tubular mating member 51.

In the conventional tube connecting structure using a quick connector, by contrast, the resin tube is connected to the engagement portion formed on the other end of the housing irrespectively of the connecting portion of the mating member, therefore, the length of the tube connecting structure becomes long. Accordingly, compared with the conventional tube connecting structure, the tube connecting structure according to the present invention is more compact and has greatly improved reliability on sealing property.

Figure 3:
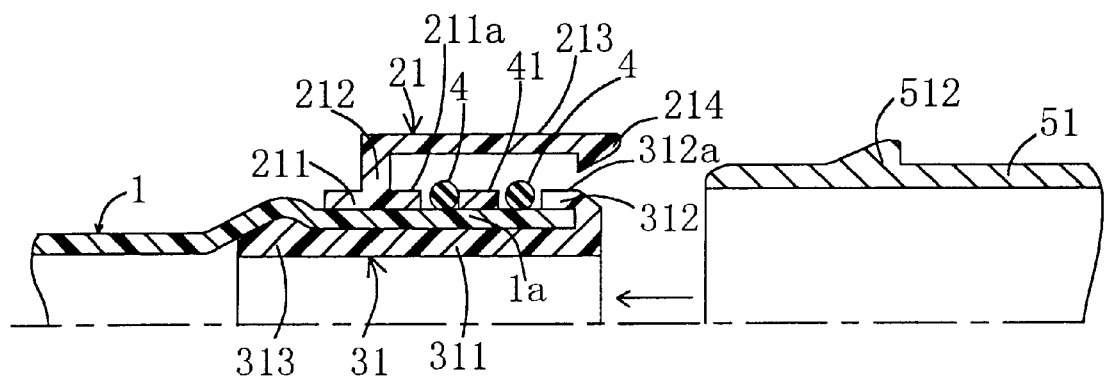
FIG. 3 is another example of the tube connecting structure according to the present invention and is a schematically cross-sectional view showing a state in which a resin tube is not yet connected to a tubular mating member, while the lower half of the view is being omitted.

Now, several other examples of the tube connecting structures according to the present invention will be described. The example of a tube connecting structure shown in FIG. 3 has the same structure as that shown in FIG. 1 and FIG. 2 except that a plurality of ring-shaped elastic seal members 4 are inserted into and attached onto the outer peripheral surface of the end portion of the resin tube 1. In this example, it is preferable that the annular member 41 is inserted between the ring-shaped elastic seal members 4 since the members 4 provided between the cylindrical base 211 of the engagement member 21 and the cap-shaped outer cylindrical portion 312 of the cylindrical press-fitted member 31 are spaced from and positioned with respect to one another. The annular member 41 has the same inner diameter as that of the cylindrical base 211 of the engagement member 21 and is fixed to the outer peripheral surface of the resin tube 1 which diameter is expanded by the cylindrical press-fitted member 31.

Figure 4:
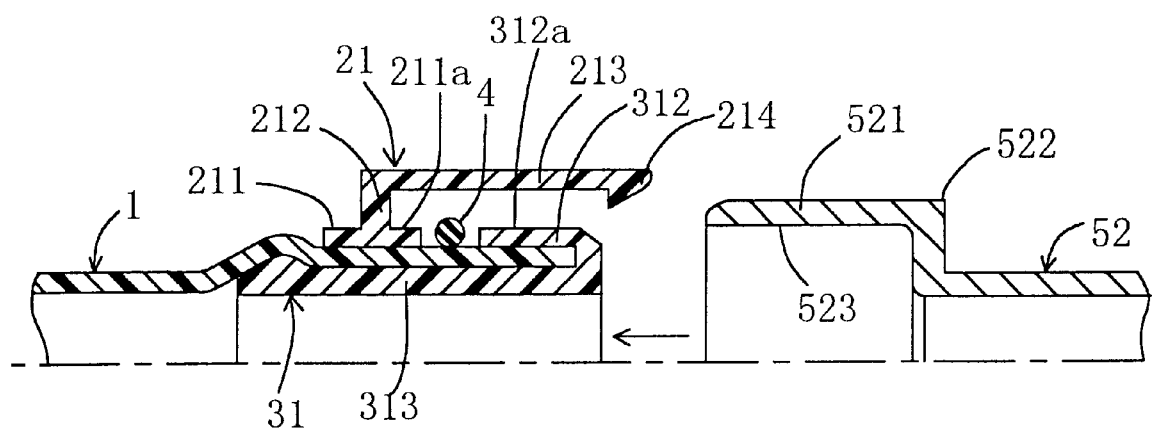
FIG. 4 is yet another example of the tube connecting structure according to the present invention and is a schematically cross-sectional view showing a state in which a resin tube is not yet connected to a tubular mating member, while the lower half of the view is being omitted.

Furthermore, the engagement member 21 and the cylindrical press-fitted member 31 of a tube connecting structure shown in FIG. 4 are the same as those shown in FIG. 1 and FIG. 2. However, the tubular mating member 52 and the second engagement portion 522 have different structures. That is, while the inner diameter of the tubular mating member 52 other than that of the insertion end portion 521 is almost the same as the inner diameter of the resin tube 1 and that of the cylindrical press-fitted member 31, the inner diameter of the insertion end portion 521 is made larger than that of the resin tube 1. Thus, as in the case of FIG. 1 and FIG. 2, the insertion end portion 521 can be inserted between the respective arm portions 213 of the engagement member 21 and the cap-shaped outer cylindrical portions 312 of the cylindrical press-fitted member 31. The shoulder portion 522 of the insertion end portion 521 having a expanded diameter acts as the second engagement portion to be engaged with the first engagement portions 214 of the engagement member 21. In addition, the insertion end portion 521 side-shoulder portion 522 abuts on the cap-shaped outer cylindrical portion 312 of the cylindrical press-fitted member 31, thereby acting as a stopper to prevent excessive insertion of the tubular mating member 52.

Figure 5:
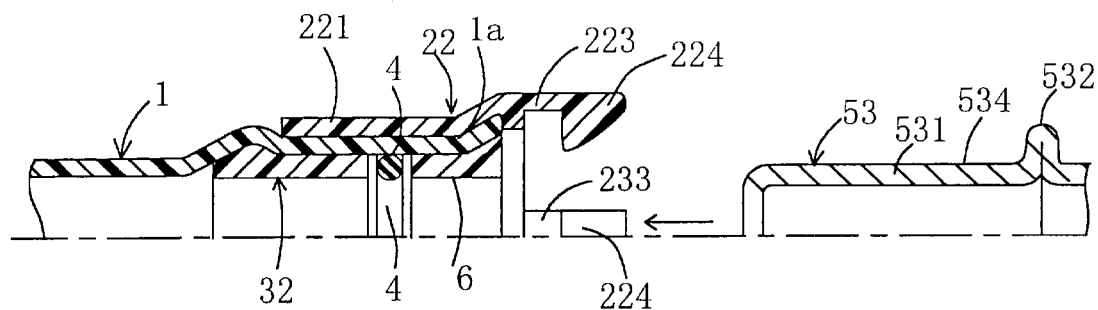
FIG. 5 is yet another example of the tube connecting structure according to the present invention and is a schematically cross-sectional view showing a state in which a resin tube is not yet connected to a tubular mating member, while the lower half of the view is being omitted.
Figure 6:
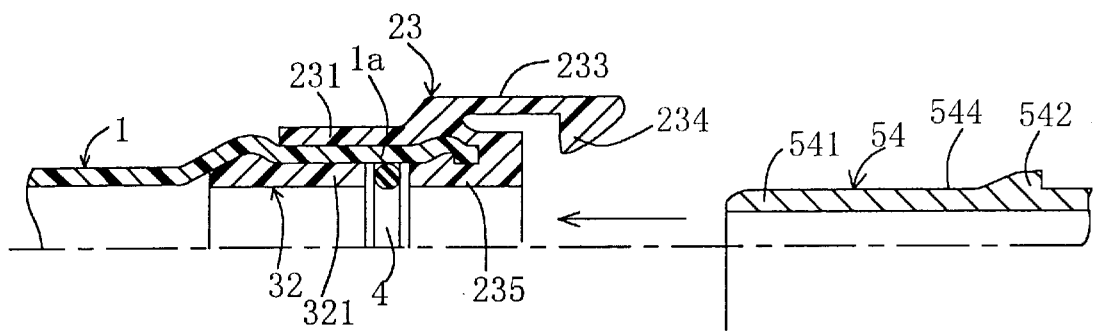
FIG. 6 is yet another example of the tube connecting structure according to the present invention and is a schematically cross-sectional view showing a state in which a resin tube is not yet connected to a tubular mating member, while the lower half of the view is being omitted.

In examples of tube connecting structures shown in FIG. 5 and FIG. 6, the ring-shaped elastic seal member 4 is inserted into and attached onto the inner peripheral surface of the end portion of the resin tube 1. In these examples, when the insertion end portion 531,541 of the tubular mating member 53,54 is inserted to thereby engage the tubular mating member with the engagement member 21, the ring-shaped elastic seal member 4 is put between the outer peripheral surface 534,544 of the insertion end portion 531,541 of the tubular mating member 53,54 and the inner peripheral surface of the end portion of the resin tube 1 and the outer peripheral surface 534,544 of the insertion end portion 531,541 and the inner surface of the end portion of the resin tube 1 are fluid-tight sealed. Thus, it is necessary that the ring-shaped elastic seal member 4 is arranged to contact with the inner peripheral surface of the end portion of the resin tube 1.

Due to this, in the example of FIG. 5, the shorter cylindrical press-fitted member 32 is first press-fitted deep into the inner peripheral surface of the end portion 1a of the resin tube 1, the ring-shaped elastic member 4 is inserted and furthermore the cylindrical retaining member 6 is press-fitted. In the example of FIG. 6, the engagement member 23 wherein one end portion of the engagement member 23 inserted into and attached onto the outer peripheral surface of the end portion 1a of the resin tube 1, integral with the cap-shaped inner cylindrical portion 235 bent to have a generally U-shaped cross-section to cover the end face of the resin tube 1, is injection-molded by resin material, is used. That is, the shorter cylindrical press-fitted member 32 is press-fitted deep into the inner surface of the end portion of the resin tube 1, and the ring-shaped elastic seal member 4 is inserted an annular groove defined the cylindrical body 321 and the engagement member 23 is finally press-fitted into the outer peripheral surface of the end portion of the resin tube 1, thereby the ring-shaped elastic seal member 4 is retained the annular groove between the cap-shaped inner cylindrical portion 235 and the cylindrical body 321 of the press-fitted member 32.

The tube connecting structures shown in FIG. 5 and FIG. 6 differ in the shape of the engagement member 22,23 from those shown in FIGS. 1 through 4 since the tubular mating member 53, 54 is inserted into the inner peripheral surface side of the end portion of the resin tube 1. In other words, although each of the engagement members 22,23 shown in FIG. 5 and FIG. 6 is inserted into and fixed onto the outer peripheral surface of the end portion of the resin tube 1 by the cylindrical base 221,231, there is no need to provide a support rising from the cylindrical base 221,231 for forming a clearance into which the tubular mating member 53,54 is inserted. Owing to this, a plurality of arm portions 223,233 are formed to directly extend from the cylindrical base 221,231 toward the one end direction axially and ratcheted first engagement portions 224,234 are provided on the tip end portions of the arm portions 223,233 respectively and ratcheted first engagement portions 224,234 are engaged with the annular second engagement portion 532,542 of the tubular mating member 53,54. It is noted that the annular second engagement protrusion 532 of the tubular mating member 53 shown in FIG. 5 is formed by bead-processing a metal pipe.

Figure 7:
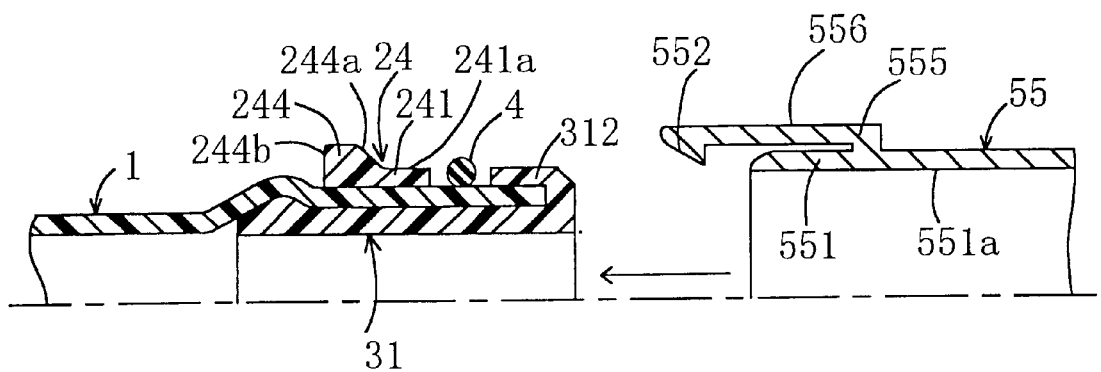
FIG. 7 is yet another example of the tube connecting structure according to the present invention and is a schematically cross-sectional view showing a state in which a resin tube is not yet connected to a tubular mating member, while the lower half of the view is being omitted.

Further in the tube connecting structure shown in FIG. 7, the shape of the first engagement portion of the resin engagement member and that of the second engagement portion of the tubular mating member are opposite to those in the above respective examples. That is, a plurality of supports 555 spaced from one another are provided on the outer peripheral surface of the insertion end portion 551 of the tubular mating member 54. A plurality of arm portions 556 are formed to extend from the upper ends of the supports 555 toward the other end axially, respectively and ratcheted second engagement portions 552 are provided to protrude from the tip end portions of the arms 556 radially inward, respectively. Meanwhile, the engagement member 24 is basically straight cylindrical and has a cylindrical base 241 having an outer peripheral surface 241a engaged with the inner peripheral surface 551a on the insertion end portion 551 of the tubular mating member 55 provided on one end thereof and the first engagement portion 244 annually protruding outward in radial direction on the other end thereof. The first engagement portion 244 has an wave-shaped inclined surface 244a on one end thereof and a stopper surface 244b provided perpendicularly to the axial direction on the other end thereof. Thus, when connecting the tubular mating member 55 to the resin tube 1, the second engagement portion 522 of the tubular mating member 55 progresses along the inclined surface 244a of the first engagement portion 244 while being elastically deformed and the diameter thereof is being expanded. When returning to its original shape, the second engagement portion 552 abuts on the stopper surface 244b, thereby snap-engaging the tubular mating member 55 with the engagement member 24.

The engagement member fitted into and attached onto the outer peripheral surface of the end portion of the resin tube can be fixed onto the outer peripheral surface of the end portion of the resin tube without positional displacement. This is because the diameter of the resin tube is expanded by the cylindrical press-fitted member press-fitted into the inner peripheral surface of the end portion of the resin tube as stated above. If high internal pressure is applied to the resin tube,etc., the engagement member is desirably fixed onto the outer peripheral surface of the end portion of the resin tube more surely and firmly.

Figure 8:
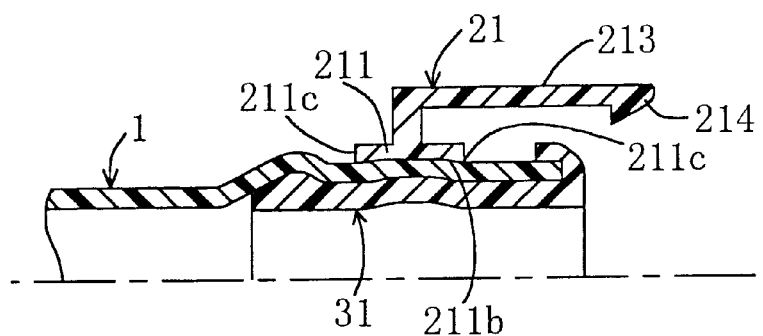
FIG. 8 is a schematically cross-sectional view showing an example of means for preventing the positional displacement of the engagement member fitted into the resin tube in the tube connecting structure according to the present invention, while the lower half of the view is being omitted.

As a means for preventing the positional displacement of the resin engagement member , there are provided, for example, annular projecting portions 211c annularly protruding inward in radial direction on both edge portions of the cylindrical base 211 of an improved engagement member 21 described in FIG. 4 as shown in FIG. 8. The annular projecting portions 211c can be bit into the outer peripheral surface of the resin tube 1. Further, a cylindrical press-fitted member 31 is formed out of metal and press-fitted into the inner peripheral surface of the resin tube 1 and the diameter of the cylindrical press-fitted member 31 is expanded mechanically from inner peripheral surface side. Thus, it is possible to bite the outer peripheral surface of the resin tube 1 into the annular projecting portions 211c provided at the cylindrical base 211 of the engagement member 21 more strongly.

Figure 9:
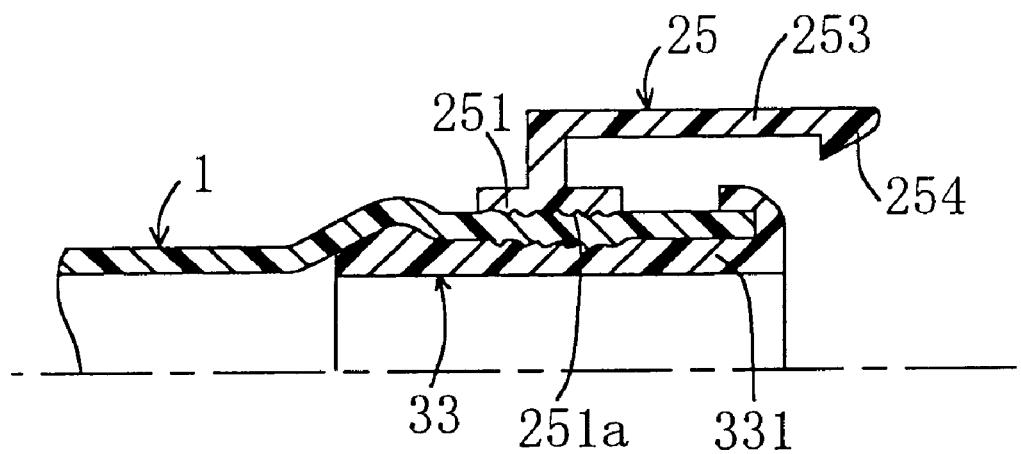
FIG. 9 is a schematically cross-sectional view showing another example of means for preventing the positional displacement of the engagement member fitted into the resin tube in the tube connecting structure according to the present invention, while the lower half of the view is being omitted.

In addition, as shown in FIG. 9, a plurality of irregular portions 251a such as saw-tooth and volute portions, which are well-known as a normal positional displacement preventing mechanism, may be provided on the inner peripheral surface of the cylindrical base 251 of the engagement member 25 which is inserted into and attached onto the outer peripheral surface of the end portion of the resin tube 1. The irregular portions 251a are bit into the outer peripheral surface of the resin tube 1, thereby allowing the engagement member 25 to be firmly fixed to the outer peripheral surface of the end portion of the resin tube 1. The irregular portions 251a may be not only provided on the cylindrical base 251 of the engagement member 25 but also on the outer peripheral surface of the cylindrical press-fitted member 33 press-fitted into the inner peripheral surface of the end portion of the resin tube 1 as shown in FIG. 9.

Figure 10:
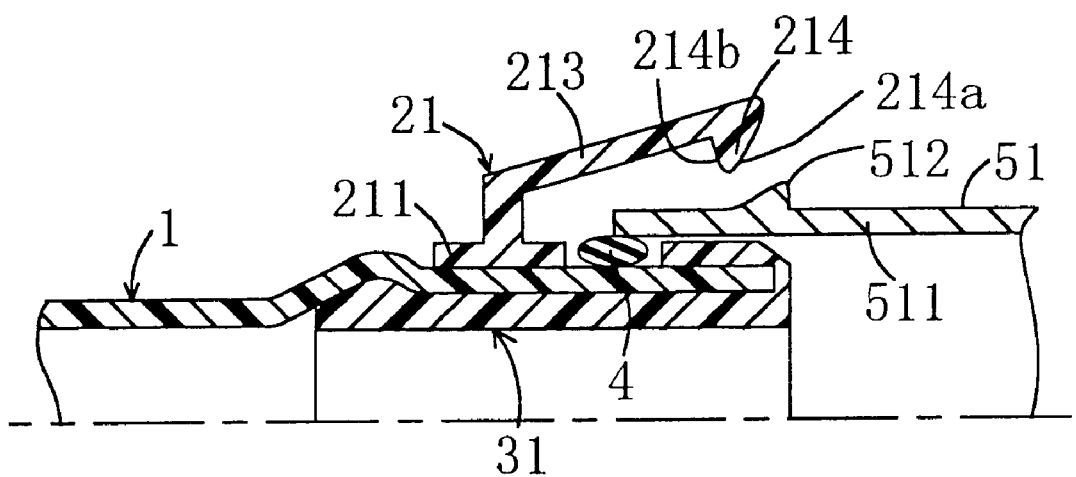
FIG. 10 is a schematically cross-sectional view showing a state in which the resin tube and the tubular mating member connected to each other are released from each other, while the lower half of the view is being omitted.

In the tube connecting structure according to the present invention, if the engagement member fixed to the resin tube is separated from the tubular mating member, the diameters of the plural arms 213 extending in the axial direction of the engagement member 21 are expanded radially outward as shown in, for example, FIG. 10 in the tube connecting structure shown in FIG. 2. The first engagement portions 214 on the tip end portions of the arm portions 213 then need to be released from the second engagement portion 512 of the tubular mating member 51 to disengage the resin tube 1 from the tubular mating member 51. Thus , to raise the respective arm portions 213 radially outward, normally the tubular mating member 51 and the resin tube 1 are pulled relative to each other while the first engagement portions 214 are being disengaged from the second engagement portion 512 pressing a tip of a cylindrical release tool (not shown) to the inclined surface 214a, the release tool inserted into the back portion of the annular second engagement protrusion 512 of the tubular mating member 51. As a result, the tubular mating member 51 can be released from the engagement member 21 fixed to the resin tube 1.

Figure 11:
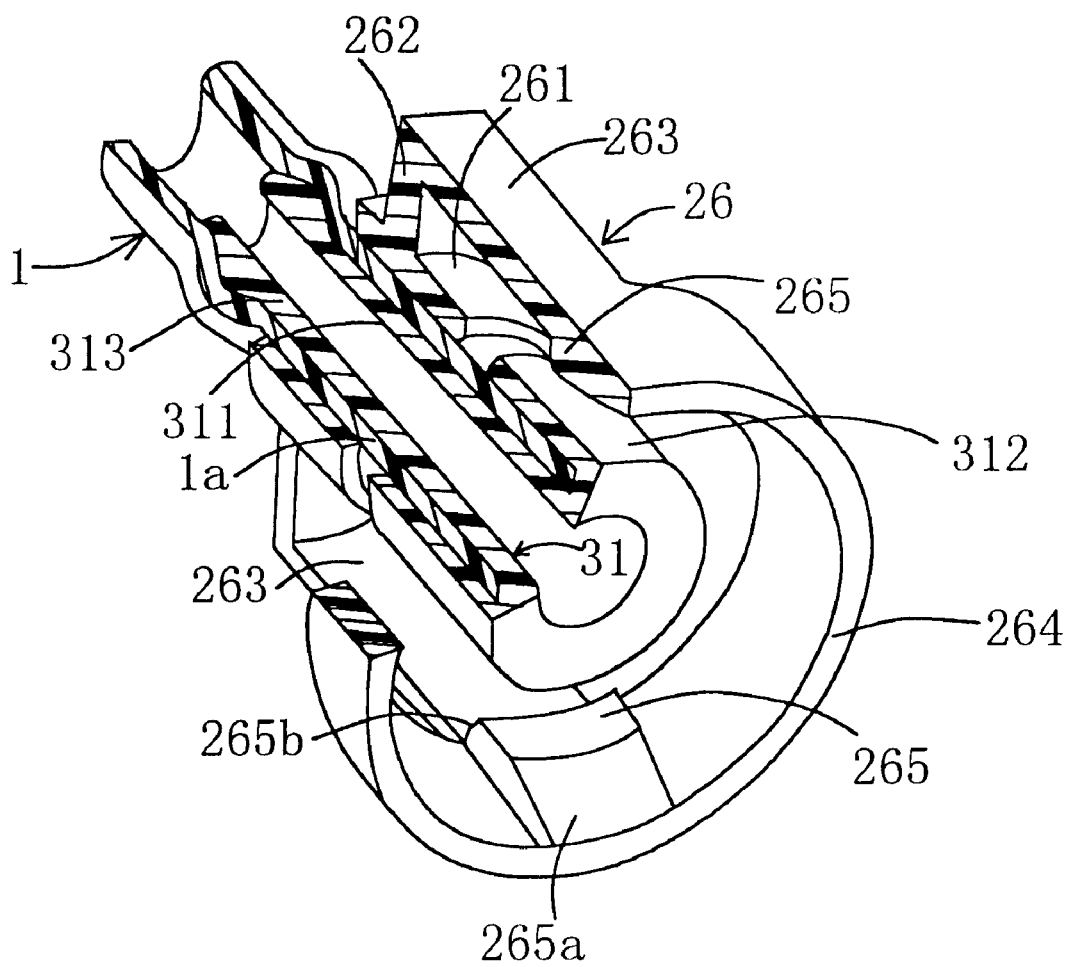
FIG. 11 is an example of describing the tube connecting structure according to the present invention and is a partially-cut perspective view showing a state in which the engagement member having a ring portion is fixedly inserted into the end portion of the resin tube.

The structure shown in FIG. 11, for example, is a preferred embodiment of the engagement member according to the present invention. That is, the tubular mating member is basically the same as that shown in FIG. 1. In this engagement member 26, however, a plurality of columnar supports 262 rising radially outwardly from the outer peripheral surface of the cylindrical base 261 are provided integrally with the base 261 while the supports 262 are circumferentially spaced apart from one another. Two arms 263 radially extending from the upper end portions of the supports 262 toward the axial one end side thereof are also formed integrally, respectively, to thereby allow the insertion end portion 511 of the tubular mating member 51 to be inserted into the tip end portions of the arms 263. Also, a circular ring 264 which can be elliptically deformed when the tubular mating member is connected to or disconnected from the resin tube 1, is provided on the tip end portions of the arms 263 coaxially and integrally with the cylindrical base 261 and a circular ring portion 264 integrally connected with a tip end portion of said arm portions 263, and said arm portions 263 defined a radial space between the arm portions 263 and both of the peripheral surface of the cylindrical base 261 and a cup-shaped outer cylindrical portion 312. A pair of ratcheted first engagement portions 265, 265 protruding radially inward are formed integrally with the ring 264 at two opposing positions on the inner peripheral surface of the ring 264, or preferably at two opposing positions on the extending line of the arm 263 or on the extension shifted by 90° from the arm 263 as shown in FIG. 11.

The above-stated ring 264 may be elliptical or oval. In that case, it is necessary to provide a pair of ratcheted first engagement portions protruding from the inner peripheral surface of the ring at two opposing positions on the axial line thereof on which the ring has the smallest inner diameter. Further, in FIG. 11, a plurality of columnar supports 262 supporting the arms 263, respectively, are shown. It is possible to provide a disc-shaped or cylindrical support rising entirely on the outer peripheral surface of the cylindrical base 261 of the engagement member 26 and to provide a plurality of arms 263 axially extending from the disc-shaped or cylindrical support. In these engagement members having the above-described ring, the structures of other portions except for the ring may be the same as the cylindrical press-fitted member 31 and the tubular mating member 51 in FIG. 1, as shown in FIG. 11.

In the tube connecting structure using the engagement member 26 having the ring 264 shown in FIG. 11, the connection between the resin tube and the tubular mating member is the same as that in FIG. 1. That is, the insertion end portion 511 of the tubular mating member 51 is inserted between the arms 263 of the engagement member 26, and the cylindrical base 261, the cap-shaped outer cylindrical portion 312 of the cylindrical press-fitted member 31. The second engagement portion 512 of the tubular mating member 51 progresses along the inclined surfaces 265a of the ratcheted first engagement portions 265, and the circular, elliptical or oval ring 264 is deformed such that the diameters of portions of the ring 264 at which the pair of the first engagement portions 265 are provided, are widened radially outward. If the second engagement portion 512 is moved beyond the first engagement portions 265, the ring 26 returns to its original shapes by elastic force, thereby snap-engaging the second engagement portion 512 of the tubular mating member 51 with the first engagement portions 265 of the engagement member 26.

Figure 12:
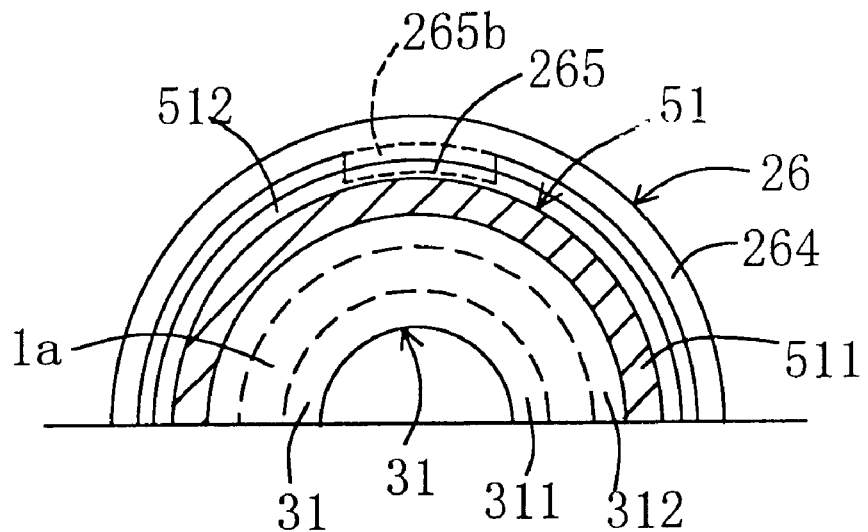
FIG. 12 is a substantially plan view seen from the right of FIG. 10, showing a state in which the engagement member is being connected to the tubular mating member which is shown cross-sectionally, while the lower half of the view is being omitted.
Figure 13:
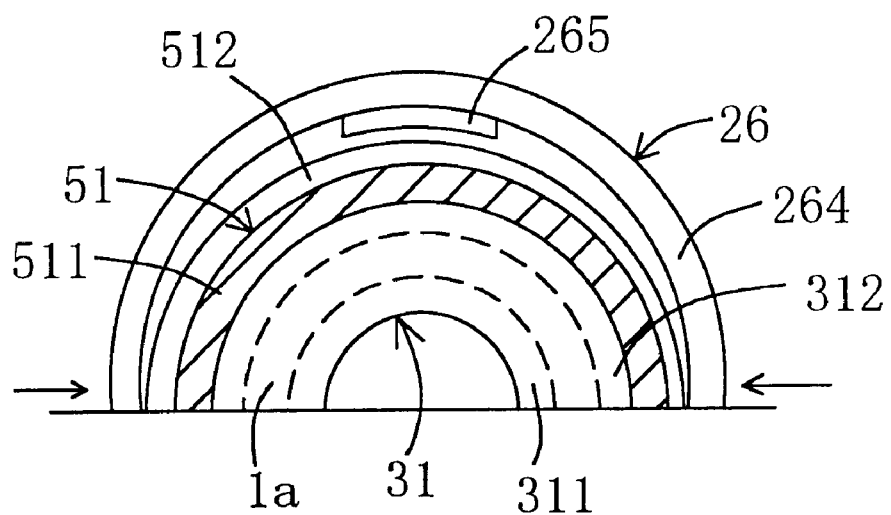
FIG. 13 is a schematically cross-sectional view showing a state in which the engagement member is released from the tubular mating member in the tube connecting structure of FIG. 11.
Figure 14:
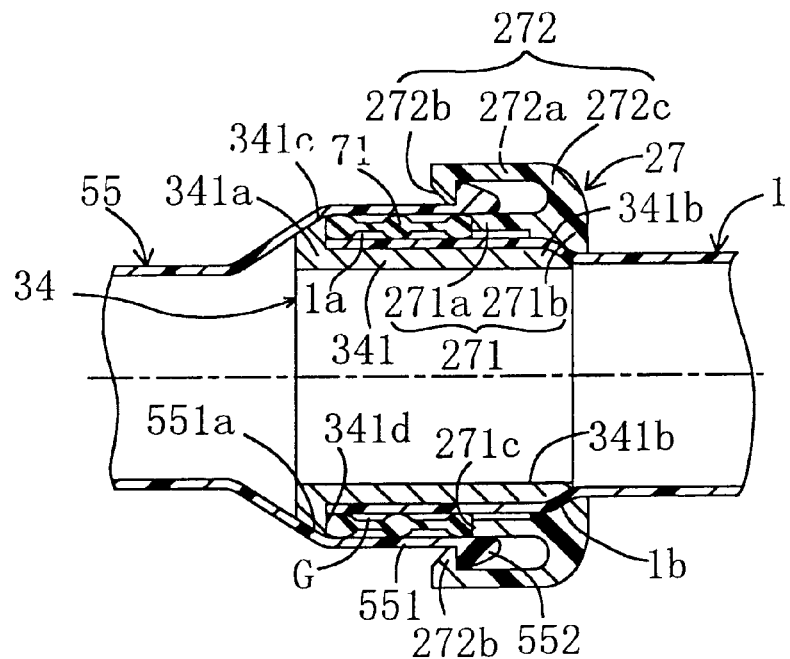
FIG. 14 is a cross-sectional view of a main portion for explaining the state where the resin tube is connected to the tubular mating member according to an embodiment other than those described above.

As described above, while the tubular mating member 51 is being connected to the engagement member 26 having the circular ring 264 as shown in, for example, FIG. 12, the annular second engagement portion 512 of the tubular mating member 51 abuts on and is stopped by the stopper surface 265b of the ratcheted first engagement portion 265 provided at the ring 264 of the engagement member 26. If the tubular mating member 51 is disengaged from the engagement member 26, the circular ring 264 of the engagement member 26 is pushed inward (indicated by an arrow in FIG. 13) from the direction almost perpendicular to the paired first engagement portions 265 to deform the ring 264 elliptically, as shown in, for example, FIG. 13, thereby expanding the distance between the opposing two first engagement portions 265. Thus, the first engagement portion 265 is disengaged from the second engagement portion 512, making it possible to separate the tubular mating member 51 from the engagement member 26 relative to each other without using a release tool.

If the engagement member having an elliptical or oval ring is used, the ring is pushed inward from the direction almost perpendicular to the paired first engagement portions (in the radial direction which the ring has the largest diameter) and the ring is then elastically deformed into generally circular shape. As a result, the distance between the paired first engagement portions provided to be opposite to each other in the radial direction which the elliptical or oval ring has the smallest inner diameter, is expanded. Thus, the first engagement portions are disengaged from the second engagement portion of the tubular mating member without using a release tool, thereby making it possible to release the tubular mating member from the engagement member.

It should be understood that the present invention can be not only worked by appropriately combining the various embodiments as stated above and but also worked in many other embodiments within the scope of the invention.

Next, a connecting structure with an inner peripheral surface of the base portion of the connecting member different from that described in the embodiments described above will be described based on FIGS. 14 to 22.

This connecting structure basically includes a resin tube 1 having a straight end portion, a tubular press-fitting member (i.e. press-fitting means) 34 which has a tubular press-fitting body 341 press-fitted into an inner peripheral surface of at least one end of the resin tube 1, a resin connecting member 27 which includes a tubular base portion 271 inserted and mounted to the other end side of the outer peripheral surface of the diameter-enlarged end portion 1a formed by inserting the tubular press-fitting body 341, and a first engaging element 272 which is integrally formed with the base portion 271, a tubular elastic sealing member 71 mounted to the outer peripheral surface of the diameter-enlarged end portion 1a of the resin tube 1, and a tubular mating member 55 including an annular second engaging projection 552 to be engaged with the first engaging element 272 of the connecting member 27 thereby being connected with the resin tube 1.

The diameter-enlarged end portion 1a of the resin tube 1 has a tapered shoulder wall 1b which is formed by the tubular press-fitting member 34 press-fitted into the inner peripheral surface of the resin tube 1 and has a diameter decreasing toward the other end side.

The tubular base portion 271 of the connecting member 27 has a restricting inner peripheral surface at the other end side 271b, and the restricting inner peripheral surface has a diameter decreasing toward the other side. By press-fitting the tubular press-fitting member 34 into the inner peripheral surface of the resin tube 1, the diameter of this portion of the resin tube 1 is enlarged. The connecting member is inserted fit to the resin tube 1 in such a manner that the restricting inner peripheral surface of the connecting member 27 is engaged or firmly attached to the outer peripheral surface of the shoulder wall 1b of the resin tube 1 to prevent the connecting member from removing outward in the axial direction.

Specifically, the reference numeral 1 denotes the resin tube. The tubular press-fitting member (i.e. press-fitting means) 34 is press-fitted into the resin tube 1 from its one end side to form a diameter-enlarged end portion 1a having an opening with a diameter larger than the other side at least at one end of the tube body of the resin tube 1. Onto the outer peripheral surface of the diameter-enlarged end portion 1a, an connecting member 27 is firmly attached in a resisting relation with respect to the tubular press-fitting body 341.

More specifically, the tubular press-fitting member 34 includes an annular flange 341a projecting outward from the outer peripheral surface of the press-fitting body 341 in a radial direction at one end side, and a tapered end portion 341b at the other end side.

The connecting member 27 includes a tubular base portion 271 and a first engaging element 272 extending from the base portion 271. The base portion 271 and the first engaging element 272 are made of resin and are integrally formed into one-piece unit by injection molding.

The base portion 271 includes an opposing end portion 271a disposed at a position remote in an opposed relation from the flange 341a of the press-fitting member 34 in the axial direction, and a resisting end portion 271b formed at the opposite side of the opposing end portion 271a. When the press-fitting member 34 is inserted into the diameter-enlarged end portion 1a of the resin tube 1, the resisting end portion 271b is in the resisting relation to the tapered end portion 341b of the press-fitting body 341. In this manner, the connecting member 27 is firmly attached to the other side of the diameter-enlarged end portion 1a of the resin tube 1.

Specifically, the connecting member 27 has a resisting end portion 271b which has a tapered surface with a diameter gradually decreasing toward the other end side and is positioned at the other end side of the base portion 271 as an inner peripheral surface corresponding to the tapered end portion 341b of the press-fitting body 341. When the press-fitting body 341 of the press-fitting member 34 is press-fitted to the diameter-enlarged end portion 1a of the resin tube 1, the connecting member 27 can be firmly attached to the tapered shoulder wall 1b which has a diameter gradually decreases toward the other end and formed at the other side of the diameter-enlarged end portion 1a of the resin tube 1.

Figure 15:
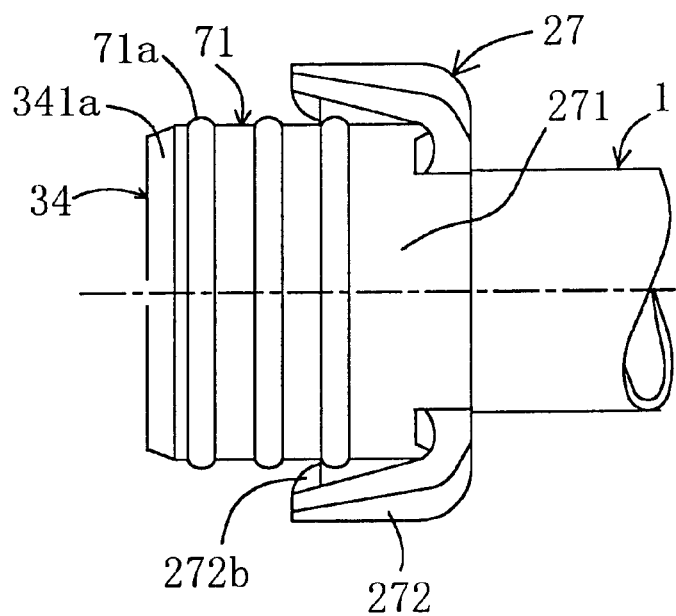
FIG. 15 is a side view of a main portion of the tube assembly of FIG. 14.

On the outer peripheral surface of the diameter-enlarged end portion 1a of the resin tube 1, an annular inner peripheral groove G is formed between the back surface 341d of the flange 341a of the press-fitting member 34 and the end surface 271c of the opposing end portion 271a of the base portion 271 of the connecting member 27. In the annular inner peripheral groove G, a annular or tubular sealing member 71 is mounted in such a manner that the annular sealing member 71 is in tightly contact with the outer peripheral surface of the diameter-enlarged end portion 11a. As a result, a tube assembly as shown in FIG. 15 is formed. The sealing member 71 has a sealing portion 71a slightly projecting from the flange 341a and the outer peripheral surface of the base portion 271.

In order that the tube assembly can be easily connected to the tubular mating member 55 in a fluid-tight condition, an inserting end portion 551 having an inner diameter slightly larger than the outer diameters of the flange 341a and the base portion 271 is formed at one end of the tubular mating member 55.

In this embodiment, the resin mating member 55 has an inserting end portion 551 with an enlarged diameter at its one end via a tapered wall 551a. When the inserting end portion 551 is relatively inserted into the diameter-enlarged end portion 1a of the resin tube 1, the inner peripheral surface of the inserting end portion 551 is engaged with the outer peripheral surface of the annular sealing member 71, and at the same time, the tapered outer peripheral surface 341c of the flange 341a of the press-fitting member 34 is brought into contact with the tapered wall portion 551a of the mating member 55. On the outer peripheral surface of the inserting end portion 551 of the mating member 55, an annular second engaging projection 552 is formed. The second engaging projection 552 is snappedly engaged with the first engaging element 272 of the connecting member 27 when the outer peripheral surface 341c of the flange 341a is brought into contact with the tapered wall 551a.

The connecting member 27 may or may not be firmly attached to the diameter-enlarged end portion 1a of the resin tube 1 beforehand.

In order to position the press-fitting member 34, the back surface 341d of the flange 341a of the press-fitting member 34 is brought into contact with the end surface of the diameter-enlarged end portion 1a of the resin tube 1.

The tubular base portion 271 of the connecting member 27 includes an opposing end portion 271a at one end side in an opposing relation to the flange 341a, and a resisting end portion 271b at the other end side having an inner peripheral surface with a diameter gradually decreasing toward the other end side. A clamping arm portion 272 include an arm 272a extending toward the one end side via the supporting portion 272c extending outward from the resisting end portion 271b in a radial direction, and an engaging claw 272b formed at the tip end of the arm 272a. The annular second engaging projection 552 is engaged with the engaging claw 272b by one-touch operation. In this manner, the resin tube 1 is easily connected with the mating member 55 in a fluid-tight condition.

Figures 16A, 16B, 16C:
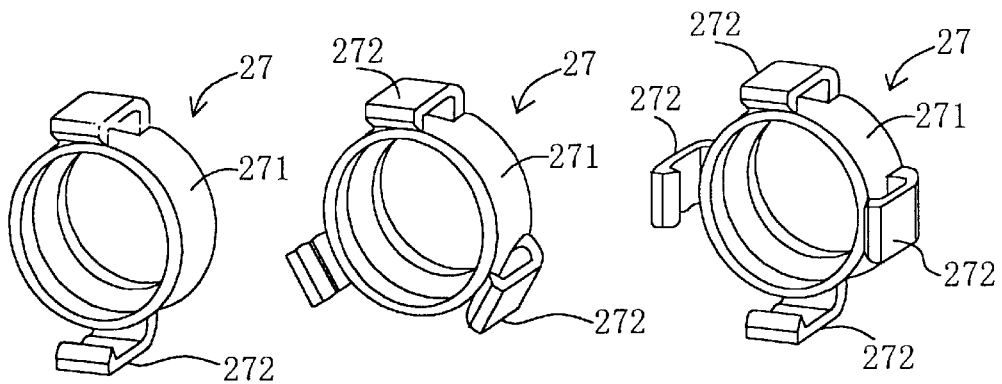
FIG. 16 is a perspective view showing various connecting members for use in the tube assembly of FIG. 14.

A plurality of engaging arms 272 may be formed in a peripheral direction at positions remote from each other at regular intervals, and the number thereof may be two as illustrated in FIG. 16A, three as illustrated in FIG. 16B, or four as illustrated in FIG. 16C. The plurality of engaging arms 272 are shown as the typical example of "the first connecting member" according to an embodiment of the present invention.

Figure 17:
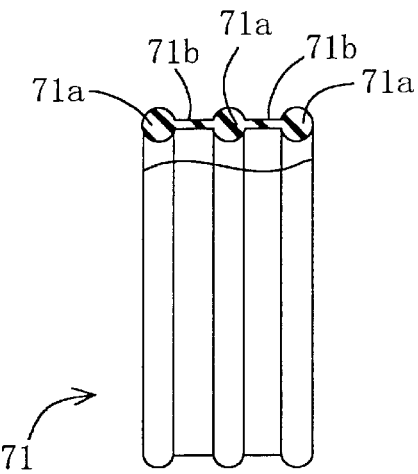
FIG. 17 is a notched cross-sectional view for explaining the annular sealing member according to an embodiment based on FIG. 14.

As illustrated in FIG. 17, the annular sealing member 71 includes a plurality of annular sealing portions 71a, 71a, and 71a with a circular cross-section which extend in a peripheral direction and are arranged on both ends and intermediate position thereof in the axial direction at regular pitch. The plurality of sealing portions are connected to each other at the intermediate position of their thickness by a straight tubular connecting portions 71b, 71b with a thickness (i.e. diameter) smaller than the sealing portions. The inner peripheral surfaces of the sealing portions 71a, 71a, 71a are engaged with the outer peripheral surface of the diameter-enlarged end portion 1a in a fluid-tight condition. The outer diameter of the sealing portion 71a is set to slightly larger than the outer diameter of the flange 341a of the press-fitting body 341.

Figures 18A, 18B:
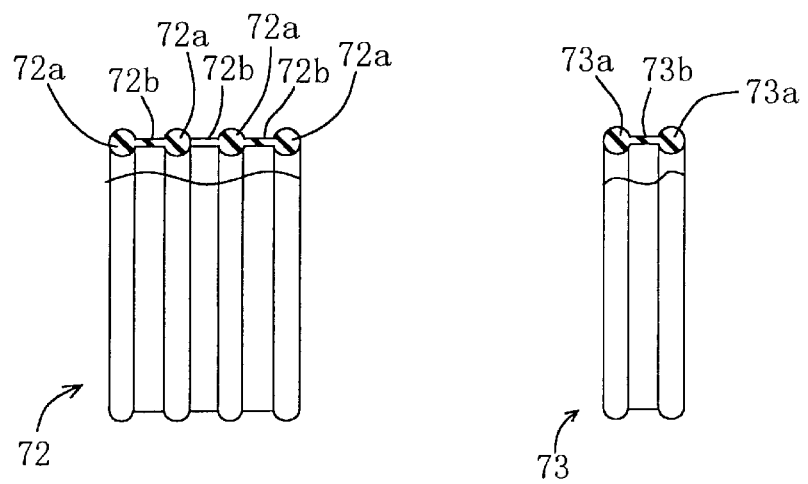
FIG. 18 is a notched cross-sectional view for explaining annular sealing member according to another embodiment based on FIG. 14.

In another embodiment of the annular sealing member, the sealing member may have various designs. For example, as illustrated in FIG. 18A, the sealing member 72 may be provided with four annular sealing portions 72a with a circular cross-section, and the four annular sealing portions 72a are connected to each other by the connecting portion 72b. Alternatively, as illustrated in FIG. 18B, the sealing member 27 may be provided two annular sealing portions 73a with a circular cross-section which are connected to each other by connecting portion 73b. It is also possible to make modifications on the annular sealing portions with a circular cross-section. For example, as illustrated in FIG. 19A, the circular sealing member 74 may be provided with annular sealing portions 74a, 74a with a rhomboid cross-section. Alternatively, as illustrated in FIG. 19B, the annular sealing member 74 may be provided with annular sealing portions 75a, 75a, 75a with a triangular cross-section.

As illustrated in FIG. 20, the press-fitting member 35 maybe formed with an annular bulge 351b with a tapered portion 351c at the end portion of its tubular press-fitting body 351 at the other end side.

As illustrated in FIG. 21, the press-fitting member 36 may be provided with a cap-shaped holding portion 361a at one end side thereof which prevents the annular sealing member 71 from removing outward in the axial direction. The cap-shaped holding portion 361a is formed with a groove 361d having an annular bottom surface 361e, and the inlet 1c of the resin tube 1 is fitted to the groove 361d to firmly fix the resin tube 1. Alternatively, the press-fitting member 36 may have annular projections 361c, 361c on the outer peripheral surface of its main body 361 to firmly fix the resin tube 1. The bottom surface 361e formed in the holding portion 361a of the press-fitting member 36 is brought into contact with the end surface of the diameter-enlarged end portion 1a of the resin tube 1.

Figure 22:
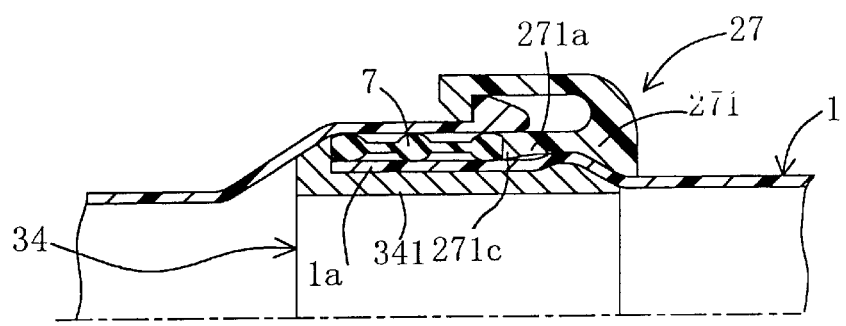
FIG. 22 is a cross-sectional view of the upper half of a main portion of the connecting member based on FIG. 14.

In an embodiment illustrated in FIG. 22, the tubular base portion 271 of the connecting member 27 is formed with an annular projection 271c with a substantially triangular cross-section which projects inward from the inner peripheral surface of the opposing end portion 271a of the base portion 271 in a radial direction. The annular projection 271c is formed to prevent the press-fitting member 34 inserted into the inner peripheral surface of the diameter-enlarged end portion 1a of the resin tube 1 and the connecting member 27 fixed to the outer peripheral surface of the diameter-enlarged end portion 1a from easily moving and slipping off the resin tube 1.

Although not being illustrated in the drawings, in a preferable embodiment of the present invention, the first engaging element of the connecting member may be designed as follows, as is the case of the connecting member described based on FIG. 11. That is, the tips end of a pair of arms extending from the tubular base portion of the connecting member in parallel with the axis is integrally connected to a ring portion, and a pair of engaging projections is formed on the inner peripheral surface of the ring. Thus-formed connecting member with the first connecting member can be easily detached from the mating member with no need for a releasing tool.

Next, another embodiment will be described based on FIGS. 23 to 25 where the outer peripheral surface of the tubular mating member is engaged with the inner peripheral surface of the sealing member, whereas in the above-described embodiments, the inner peripheral surface of the tubular mating member is engaged with the outer peripheral surface of the sealing member.

Figure 23:
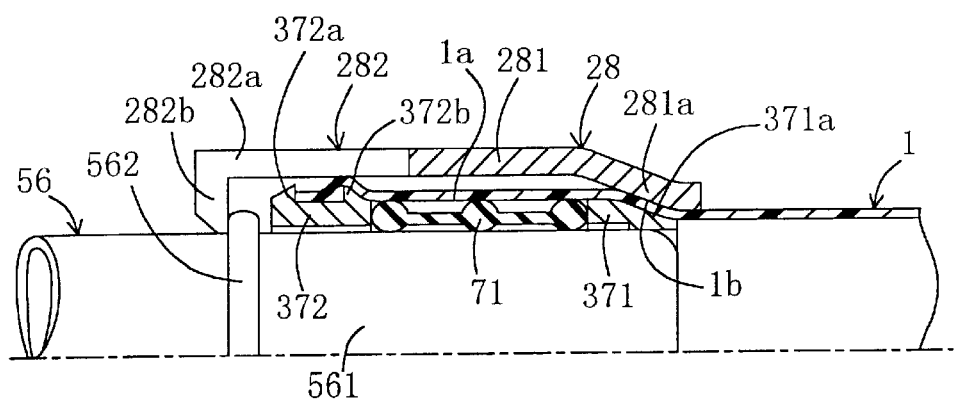
FIG. 23 is a cross-sectional view of a main portion for explaining the state where the resin tube is connected to the tubular mating member according to an embodiment still other than those described above.
Figure 24:
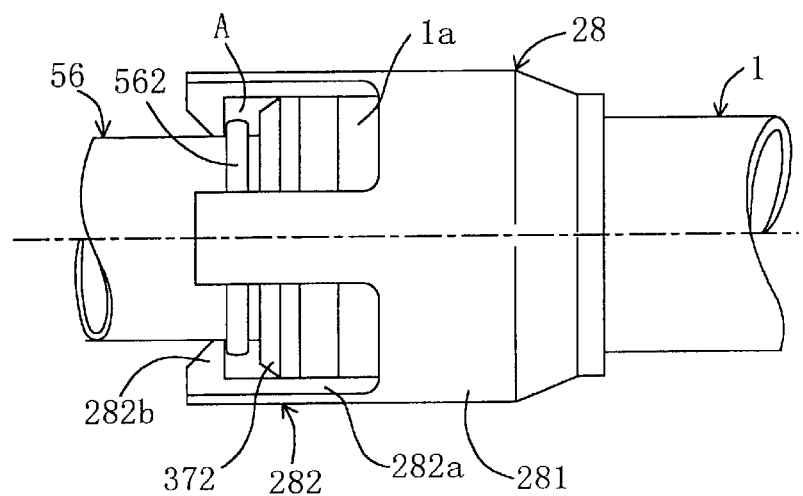
FIG. 24 is a side view of FIG. 23.

In FIGS. 23 and 24, the reference numeral 1 denotes a resin tube. From one end of the resin tube 1, a first press-fitting member 371 and a second press-fitting member 372 are press-fitted to form a diameter-enlarged end portion 1a at one end of the resin tube 1 which has a diameter larger than the other side. The first press-fitting member 371 inserted into the resin tube 1 forms a tapered shoulder wall 1b with a diameter decreasing toward the other end in the diameter-enlarged end portion 1a. To the outer peripheral surface of the tapered shoulder wall 1b of the diameter-enlarged end portion 1a, the connecting member 28 is attached and fixed in the resisting relation with respect to the first press-fitting member 371.

The first press-fitting member 371 includes a tapered portion 371a having a tapered outer peripheral surface with a diameter gradually decreasing toward the other end. The second press-fitting member 372 includes a flange 372a projecting from the outer peripheral surface of its tubular press-fitting body on one end side. The second press-fitting member 372 is coaxially disposed at a position remote from the first press-fitting member 371 at one end side.

The connecting member 28 includes a tubular base portion 281 and a first engaging element 282. The first engaging element 282 has an arm 282a extending from one end of the tubular base portion 281 in the axial direction.

More specifically, the base portion 281 of the connecting member 28 is formed with a tapered tubular wall portion 281a at the other end side thereof, and the tapered tubular wall portion 281a has a diameter gradually decreasing toward the other end side. When the first press-fitting bush 371 is press-fitted into the diameter-enlarged end portion 1a of the resin tube 1, the tapered tubular wall portion 281a is in resisting relation to the tapered end portion 371a. As a result, the connecting member 28 is attached and fixed to the shoulder wall 1b formed at the other end side of the diameter-enlarged end portion 1a of the resin tube 1 together with the first press-fitting member 371. The second press-fitting member 372 is formed with an annular detent 372b with a tapered surface at its other end side. The annular detent 372b prevents the second press-fitting bush 372 from removing and slipping off the resin tube 1 after it is press-fitted and fixed to one end of the diameter-enlarged end portion 1a of the resin tube 1. Between the first press-fitting member 371 and the second press-fitting member 372, a space is created, and this space cooperates with the inner peripheral surface of the diameter-enlarged end portion 1a to form an annular inner peripheral groove in the inner periphery of the diameter-enlarged end portion 1a. In the annular groove, a sealing member 71 is mounted in such a manner that the sealing portion at the inner peripheral side of the sealing member 71 projects slightly inward from the inner peripheral surfaces of the first press-fitting member 371 and the second press-fitting member 372.

The connecting member 28, attached and fixed to the resin tube 1, has a first engaging element 282 including a plurality of arms 282a disposed at a position remote from each other in a peripheral direction and extending from the base portion 281a in parallel with the axis toward one end side, and engaging claws 282b respectively formed on the tip ends of these arms 282a and facing inward. When the inserting end portion 561 of the mating member 56, which is designed to be insertable into the inner peripheral surfaces of the first press-fitting member 371 and the second press-fitting member 372, is relatively inserted into the diameter-enlarged end portion 1a of the resin tube 1 and is engaged with the inner peripheral surface of the annular sealing member 71, a space A is created between the engaging claw 282b and the second press-fitting bush 372. The annular second engaging portion 562 projecting from the outer peripheral surface of the inserting end portion 561 can be snappedly inserted into the space A. In this manner, the engaging claw 282b of the engaging arm (i.e. the first engaging element) 282 is engaged with the second engaging portion 562, thereby connecting the resin tube 12 to the tubular mating member 56 in a fluid-tight condition.

As described above, the first press-fitting member 371 and the second press-fitting member 372 have inner diameters slightly larger than the inner diameter of the annular sealing member 71. With this arrangement, the inserting end portion 561 of the mating member 56 is inserted and fixed to the first press-fitting member 371 and the second press-fitting member 372, thereby connecting the resin tube 1 to the mating member 56 in a fluid-tight condition.

Figure 25:
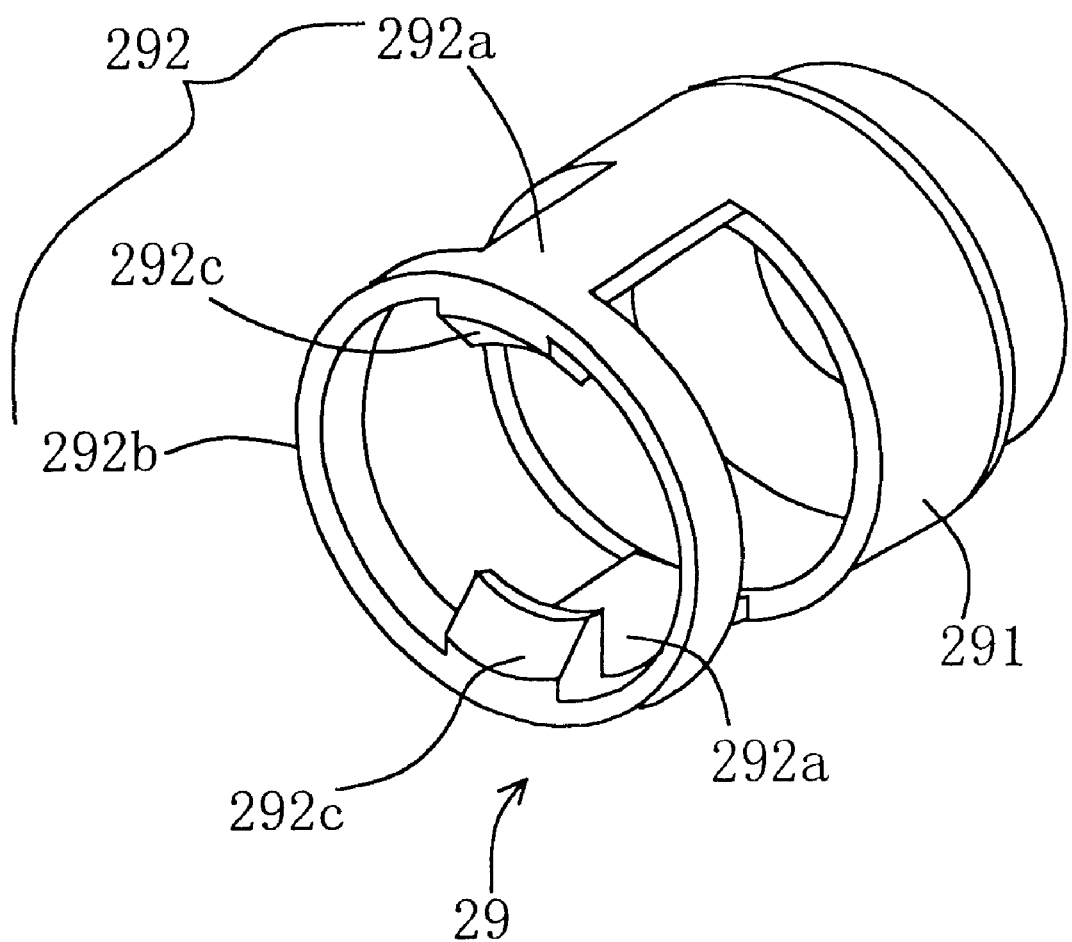
FIG. 25 is a perspective view showing an connecting member according to still another embodiment of FIG. 23.

As a preferable embodiment of the connecting member illustrated in FIGS. 23 and 24, a connecting member 29 may have the following structure, as illustrated in FIG. 25. A ring 292b may be integrally formed on the tip end of a pair of parallel arms 292a, 292a which are opposed to each other in a radial direction and extend in parallel to each other from the tubular base portion 291. On the inner peripheral surface of the ring 292b, a pair of engaging projections 292c, 292c are formed as a first clamping portion 292 together. Thus-formed connecting member 29 makes it possible to easily to release the pair of engaging projections 292c, 292c from the second engaging portion of the mating member so as to easily detach the resin tube from the mating member with no need for a releasing tool by deforming the ring 292b.

The embodiments of the present invention can be embodied in various forms, and also may be embodied in combination thereof. These embodiments may be embodied in other various forms without departing from the spirits of essential characteristics thereof.

What is claimed is:

1. A connecting structure for connecting a resin tube to a tubular mating member in a fluid-tight condition, comprising:

said resin tube including a tube body having a cylindrical wall of substantially uniform thickness, and a diameter-enlarged end portion formed at one end of the tube body;

a connection member having a tubular base portion and a first engagement element, said tubular base portion being fitted onto an axially-inner end portion of the diameter-enlarged end portion of said resin tube, and the first engagement element extending outwardly from the base portion;

tubular press-fitting means for preventing said connection member from moving axially outward relative to said resin tube, said tubular press-fitting means including a press-fitting body and an annular element which protrudes radially outward from an axially outer end of the press-fitting body while projecting beyond an outer circumferential surface of the diameter-enlarged end portion, the press-fitting body being press-fitted into the one end of said resin tube to thereby form the diameter-enlarged end portion and fixedly engage the axially-inner end portion of the diameter-enlarged end portion with an inner circumferential surface of the base portion of said connection member;

an annular sealing member disposed in an annular outer circumferential groove defined by the outer circumferential surface of the diameter-enlarged end portion, the annular element of the press-fitting body, and the base portion of said connection member;

said tubular mating member including a fitting end portion which can be fitted onto an outer circumference of the annular element of the press-fitting body and an outer circumference of the base portion of said connection member, while engaging an outer circumference of said sealing member in a fluid-tight condition;

a second engagement element projecting radially outward from an outer circumferential surface of the fitting end portion of said mating member, the second engagement element engaging the first engaging element when the fitting end portion is fitted onto the diameter-enlarged end portion.

2. A connecting structure according to claim 1, wherein the annular element is formed by a flange-shaped or cap-shaped holder.

3. A connecting structure according to claim 1, wherein said connection member has a tubular base end portion, a pair of parallel arm portions extending axially outward from the base end portion symmetrically with respect to a center axis of said connection member, a ring portion substantially concentric with the center axis and connected to free ends of the arm portions, and engagement pawls projecting radially inward from an inner circumferential surface of the ring portion.

4. A connecting structure for connecting a resin tube to a tubular mating member in a fluid-tight condition comprising:

a resin tube including a tube body having a cylindrical wall of substantially uniform thickness, and a diameter-enlarged end portion formed at one end of the tube body;

a connection member having a tubular base portion and a first engagement element, the tubular base portion being fitted onto an axially-inner end portion of the diameter-enlarged end portion of said resin tube, and the first engagement element extending outwardly from the base portion;

tubular press-fitting means for preventing said connection member from moving axially outward relative to said resin tube, said tubular press-fitting means including first and second press-fitting bodies and an annular element which protrudes radially outward from an axially outer end of the second press-fitting body while projecting beyond an outer circumferential surface of the diameter-enlarged end portion, the first and second press-fitting bodies being press-fitted into the one end of said resin tube to thereby form the diameter-enlarged end portion and fixedly engage the axially-inner end portion of the diameter-enlarged end portion with an inner circumferential surface of the base portion of said connection member;

an annular sealing member disposed in an annular inner circumferential groove defined by an inner circumferential surface of the diameter-enlarged end portion, the first press-fitting body, and the second press-fitting body;

said tubular mating member including an inserting end portion which can be inserted into the first and second press-fitting bodies of said press-fitting means, while engaging an inner circumference of said sealing member in a fluid-tight condition; and a second engagement element projecting radially outward from an outer circumferential surface of the inserting end portion of said mating member, the second engagement element engaging the first engaging element when the inserting end portion is inserted into the diameter-enlarged end portion;

wherein said connection member has a tubular base end portion, a pair of parallel arm portions extending axially outward from the base end portion symmetrically with respect to a center axis of said connection member, a ring portion substantially concentric with the center axis and connected to free ends of the arm portions, and engagement pawls projecting radially inward from an inner circumferential surface of the ring portion.

* * * * *

UNITED STATES PATENT AND TRADEMARK OFFICE
CERTIFICATE OF CORRECTION

PATENT NO.     : 6,481,759 B1
DATED          : November 19, 2002
INVENTOR(S)    : Kawasaki et al.

It is certified that error appears in the above-identified patent and that said Letters Patent is hereby corrected as shown below:

<u>Title page,</u>
Item [45], and Notice information should read as follows:
-- [45]   **Date of Patent: \*Nov. 19, 2002**
(\*) Notice: Subject to any disclaimer, the term of this patent is extended or adjusted under 35 U.S.C. 154(b) by 0 days.

This patent is subject to a terminal disclaimer. --

Signed and Sealed this

Fifteenth Day of April, 2003

JAMES E. ROGAN
*Director of the United States Patent and Trademark Office*